US007359873B2

(12) United States Patent
Roberts et al.

(10) Patent No.: US 7,359,873 B2
(45) Date of Patent: Apr. 15, 2008

(54) SELF-SERVICE CATALOG MANAGER FOR STORES IMPLEMENTED ON A COMMUNICATIONS NETWORK

(75) Inventors: Timothy Roberts, San Francisco, CA (US); Jyh-Herng Chow, San Jose, CA (US); Sara Hicks, Santa Monica, CA (US); Jimmy R. Duvall, San Jose, CA (US)

(73) Assignee: Yahoo, Inc., Sunnyvale, CA (US)

( * ) Notice: Subject to any disclaimer, the term of this patent is extended or adjusted under 35 U.S.C. 154(b) by 575 days.

(21) Appl. No.: 10/800,146

(22) Filed: Mar. 11, 2004

(65) Prior Publication Data

US 2005/0065856 A1 Mar. 24, 2005

Related U.S. Application Data

(60) Provisional application No. 60/504,577, filed on Sep. 19, 2003.

(51) Int. Cl.
*G06Q 30/00* (2006.01)
(52) U.S. Cl. .......................... 705/26; 705/14; 705/27; 705/28; 707/200; 707/E17.108; 707/E17.11
(58) Field of Classification Search ................ 705/14, 705/26, 27, 28; 345/740; 707/200, E17.108, 707/E17.11
See application file for complete search history.

(56) References Cited

U.S. PATENT DOCUMENTS

| 5,884,309 | A | | 3/1999 | Vanechanos, Jr. |
| 5,999,914 | A | * | 12/1999 | Blinn et al. .................... 705/26 |
| 2003/0050847 | A1 | * | 3/2003 | Bleicken et al. .............. 705/26 |
| 2004/0217985 | A9 | * | 11/2004 | Ries et al. .................. 345/740 |
| 2004/0225578 | A1 | * | 11/2004 | Hager et al. .................. 705/26 |
| 2006/0190355 | A1 | * | 8/2006 | Jammes et al. ............... 705/27 |

OTHER PUBLICATIONS

Business Editors/Technology Writers (May 23). Sensormatic Enters New Market With First RFID In-Store Inventory Management Installation at Movie Gallery. Business Wire, 1. Retrieved Jan. 31, 2008, from Business Dateline database. (Document ID: 54053810), FROM Proquest website.*

* cited by examiner

*Primary Examiner*—Yogesh C. Garg
(74) *Attorney, Agent, or Firm*—Brinks Hofer Gilson Lione

(57) ABSTRACT

A computerized self-service platform assists merchants in creating and managing stores on a computer network. In one aspect, a system for managing a store includes a product database and an ecommerce storefront, with the ecommerce storefront referencing information in the product database. A product administration module (e.g., a catalog manager) allows the merchant to manage the product database on a self-serve basis. Separating the storefront from the product database can yield numerous advantages.

14 Claims, 46 Drawing Sheets

YAHOO! SMALL BUSINESS
*Merchant Solutions*

Welcome, yahoo_user
[ Sign Out, Account Info ]

Small Business Home - Yahoo! - Help

[ Mail ] [ Manage My Services ]

acmestore.com: Merchant Professional

Store Manager > Catalog Manager > Items

| Items | Inventory | Tables | Upload | Publishing |

Items - All Tables

Here you can create, edit, and manage the items in your product catalog. To edit a single item, click on its name in the list below. To edit all of the items on this page, click "Edit These Items." To search for items in your catalog, click "Search." To add a new item, select the appropriate table using the "View," pulldown menu, then click "Add Item." To change prices for all of your items click "Change Prices."

View: [All Tables ▼] — 410          [Add Item] — 419    [Items per Page [25 ▼]]    [Edit These Items] — 416    [Search] — 414    [Change Prices] — 417

[Delete] [Move] — 423 checked items                                                    Showing 1-25 of 200 | Previous | Next 415 — Check All - Clear All

412

| ID ▲ | Name | Code | Price | Sale-price | Ship-weight | Orderable | Taxable | Table |
|---|---|---|---|---|---|---|---|---|
| ☐ alligatorcookie | Alligator Cookie | ALL01 | 5.00 | | 2 | Yes | Yes | TableX |
| ☐ alphabetcookie | Alphabet Cookie | ALP01 | 22.00 | | 5 | No | Yes | TableY |
| ☐ amarylliscookie | Amaryllis Cookie | AMA01 | 13.00 | | 89 | Yes | No | TableZ |
| ☐ aphidcookie | Aphid Cookie | APH01 | 150.00 | | 12 | Yes | Yes | TableX |
| ☐ azurecookie | Azure Cookie | AZU01 | 2345.00 | 1000.00 | 9 | Yes | No | TableX |
| ☐ baxtercookie | Baxter Cookie | BAXTER01 | 1.25 | | 21 | Yes | Yes | TableQ |
| ☐ biscuitcookie | Biscuit Cookie | BIS01 | 12.99 | | 89 | No | Yes | TableX |
| ☐ buckwheatcookie | Buckwheat Cookie | BUCK01 | 3.65 | | 12 | Yes | Yes | TableX |
| ☐ buttercookie | Butter Cookie | BUT01 | 8.20 | | 45 | Yes | Yes | TableA |
| ☐ cheesycookie | Cheesy Cookie | CHEESY01 | 4.30 | | 324 | Yes | Yes | TableU |
| ☐ chocolatechipcookie | Chocolate Chip Cookie | CHOCOCHIP01 | 2.95 | 1.25 | 45 | No | Yes | TableX |
| ☐ chocolatechocolatecookie | Chocolate Chocolate Cookie | CHOCOCHOCO01 | 9.99 | | 98 | Yes | Yes | TableX |
| ☐ chocolatecookie | Chocolate Cookie | CHOCO01 | 19.99 | | 89 | Yes | Yes | TableZ |

FIG. 4A

| | | | | | |
|---|---|---|---|---|---|
| ☐ corncookie | Corn Cookie | CORN01 | 99.99 | | Yes | No | TableZ |
| ☐ darkchocolatecookie | Dark Chocolate Cookie | DKCHOCO01 | 199.99 | 12.50 | Yes | Yes | TableX |
| ☐ discuscookie | Discus Cookie | DIS01 | 21.75 | | Yes | No | TableX |
| ☐ elephantcookie | Elephant Cookie | ELE01 | 12.34 | | No | No | TableZ |
| ☐ fairycookie | Fairy Cookie | FAIRY01 | 23.34 | | Yes | Yes | TableY |
| ☐ fancycookie | Fancy Cookie | FANCY01 | 1.68 | | Yes | No | TableQ |
| ☐ farflecookie | Farfle Cookie | FAR01 | 2.89 | 234 | Yes | Yes | TableF |
| ☐ fridgecookie | Fridge Cookie | FRIDGE01 | 3.93 | | Yes | No | TableX |
| ☐ gooeycookie | gooeycookie | GOOEY01 | 19.79 | 34 | Yes | Yes | TableV |
| ☐ happycookie | Happy Cookie | HAPPY01 | 4.06 | | No | Yes | TableC |
| ☐ heartcookie | Heart Cookie | HEART01 | 67.43 | 34 | Yes | Yes | TableQ |
| ☐ heavycookie | Heavy Cookie | HEAVY01 | 12.09 | | Yes | Yes | TableX |

Check All - Clear All
Delete | Move | checked items
View: [All Tables ▼]

Add Item | Items per Page [25 ▼] | Showing 1-25 of 200 | Previous | Next
Edit These Items | Search | Change Prices Privacy Policy - Copyright Policy - Terms of Service - Help

FIG. 4A (cont.)

YAHOO! SMALL BUSINESS Welcome, yahoo_user
*Merchant Solutions* [ Sign Out, Account Info ]

Small Business Home - Yahoo! - Help acmestore.com: Merchant Professional

[ Mail ]  [ Manage My Services ]

Store Manager > Catalog Manager > Items

| Items | Inventory | Tables | Upload | Publishing |

Items - Cookies

Here you can create, edit, and manage the items in your product catalog. To edit a single item, click on its name in the list below. To edit all of the items on this page, click "Edit These Items." To search for items in your catalog, click "Search." To add a new item, select the appropriate table using the "View:" pulldown menu, then click "Add Item." To change prices for all of your items click "Change Prices."

| Add Item | Edit These Items | Search | Change Prices |

View: [Cookies ▼] — 420

[Delete] [Move] checked items

Items per Page [25 ▼]   Showing 1-25 of 200 | Previous | Next

Check All - Clear All

Customize View

| | ID | Name | Code | Price | Sale-price | Ship-weight | Orderable | Taxable |
|---|---|---|---|---|---|---|---|---|
| ☐ | alligatorcookie | Alligator Cookie | ALL01 | 5.00 | | 2 | Yes | Yes |
| ☐ ☐ | alphabetcookie | Alphabet Cookie<br>A Shape, Blue<br>A Shape, Red<br>A Shape, Green | ALP01<br>ALP01A<br>ALP01B<br>ALP01C | 22.00 | | 5 | No | Yes |
| ☐ | amarylliscookie | Amaryllis Cookie | AMA01 | 13.00 | | 89 | Yes | No |
| ☐ | aphidcookie | Aphid Cookie | APH01 | 150.00 | | 12 | Yes | Yes |
| ☐ | azurecookie | Azure Cookie | AZU01 | 2345.00 | 1000.00 | 9 | Yes | No |
| ☐ | baxtercookie | Baxter Cookie | BAXTER01 | 1.25 | | 21 | Yes | Yes |
| ☐ | biscuitcookie | Biscuit Cookie | BIS01 | 12.99 | | 89 | No | Yes |
| ☐ | buckwheatcookie | Buckwheat Cookie | BUCK01 | 3.65 | | 12 | Yes | Yes |
| ☐ | buttercookie | Butter Cookie | BUT01 | 8.20 | | 45 | Yes | Yes |
| ☐ | cheesycookie | Cheesy Cookie | CHEESY01 | 4.30 | | 324 | Yes | Yes |
| ☐ | chocolatechipcookie | Chocolate Chip Cookie | CHOCOCHIP01 | 2.95 | 1.25 | 45 | No | Yes |
| ☐ | chocolatechocolatecookie | Chocolate Chocolate Cookie | CHOCOCHOCO01 | 9.99 | | 98 | Yes | Yes |

| | | | | | |
|---|---|---|---|---|---|
| ☐ chocolatecookie | Chocolate Cookie | CHOCO01 | 19.99 | | Yes | Yes |
| ☐ corncookie | Corn Cookie | CORN01 | 99.99 | | Yes | No |
| ☐ darkchocolatecookie | Dark Chocolate Cookie | DKCHOCO01 | 199.99 | 12.50 | Yes | Yes |
| ☐ discuscookie | Discus Cookie | DIS01 | 21.75 | | Yes | No |
| ☐ elephantcookie | Elephant Cookie | ELE01 | 12.34 | | No | No |
| ☐ fairycookie | Fairy Cookie | FAIRY01 | 23.34 | | Yes | Yes |
| ☐ fancycookie | Fancy Cookie | FANCY01 | 1.68 | | Yes | No |
| ☐ farflecookie | Farfle Cookie | FAR01 | 2.89 | | Yes | Yes |
| ☐ fridgecookie | Fridge Cookie | FRIDGE01 | 3.93 | | Yes | No |
| ☐ gooeycookie | gooeycookie | GOOEY01 | 19.79 | 12.50 | Yes | Yes |
| ☐ happycookie | Happy Cookie | HAPPY01 | 4.06 | | No | Yes |
| ☐ heartcookie | Heart Cookie | HEART01 | 67.43 | | Yes | Yes |
| ☐ heavycookie | Heavy Cookie | HEAVY01 | 12.09 | | Yes | Yes |

Check All - Clear All

Delete | Move checked items

View: Cookies ▼

Items per Page 25 ▼ Update | Showing 1-25 of 200 | Previous | Next

Add Item | Edit These Items | Search | Change Prices

Privacy Policy - Copyright Policy - Terms of Service - Help

FIG. 4B (cont.)

YAHOO! SMALL BUSINESS
*Merchant Solutions*

Welcome, yahoo_user
[ Sign Out, Account Info ]

Small Business Home - Yahoo! - Help

[ Mail ] [ Manage My Services ]

acmestore.com: Merchant Professional

Store Manager > Catalog Manager > Items > Search

Search

Please enter one or more search terms in the "Keyword:" field. If you would like to limit your search to a particular table or field, make your selection(s) using the pulldown menus below.

Keyword: [          ]
Table: [ All Tables ▾ ]
Field: [ ID ▾ ]

[ Search ] [ Cancel ]

Privacy Policy - Copyright Policy - Terms of Service - Help

FIG. 4C

YAHOO! SMALL BUSINESS Merchant Solutions
Welcome, yahoo_user
[ Sign Out, Account Info ]

Small Business Home - Yahoo! - Help

[ Mail ] [ Manage My Services ]

acmestore.com: Merchant Professional

Store Manager > Catalog Manager > Items > Search > Search Results

Search Results

Search for "Cookies" In Name for all Tables

Items per Page [25 ▼]   Showing 1-25 of 200 | Previous | Next   Search Again

| ID ▲ | Name | Code | Price | Sale-price | Ship-weight | Orderable | Taxable |
|---|---|---|---|---|---|---|---|
| alligatorcookie | Alligator Cookie | ALL01 | 5.00 | | 2 | Yes | Yes |
| alphabetcookie | Alphabet Cookie | ALP01 | 22.00 | | 5 | No | Yes |
| amarylliscookie | Amaryllis Cookie | AMA01 | 13.00 | | 89 | Yes | No |
| aphidcookie | Aphid Cookie | APH01 | 150.00 | | 12 | Yes | Yes |
| azurecookie | Azure Cookie | AZU01 | 2345.00 | 1000.00 | 9 | Yes | No |
| baxtercookie | Baxter Cookie | BAXTER01 | 1.25 | | 21 | Yes | Yes |
| biscuitcookie | Biscuit Cookie | BIS01 | 12.99 | | 89 | No | Yes |
| buckwheatcookie | Buckwheat Cookie | BUCK01 | 3.65 | | 12 | Yes | Yes |
| buttercookie | Butter Cookie | BUT01 | 8.20 | | 45 | Yes | Yes |
| cheesycookie | Cheesy Cookie | CHEESY01 | 4.30 | | 324 | Yes | Yes |
| chocolatechipcookie | Chocolate Chip Cookie | CHOCOCHIP01 | 2.95 | 1.25 | 45 | No | Yes |
| chocolatechocolatecookie | Chocolate Chocolate Cookie | CHOCOCHOCO01 | 9.99 | | 98 | Yes | Yes |
| chocolatecookie | Chocolate Cookie | CHOCO01 | 19.99 | | 89 | Yes | Yes |
| corncookie | Corn Cookie | CORN01 | 99.99 | | | Yes | No |
| darkchocolatecookie | Dark Chocolate Cookie | DKCHOCO01 | 199.99 | 12.50 | 234 | Yes | Yes |
| discuscookie | Discus Cookie | DIS01 | 21.75 | | | Yes | No |
| elephantcookie | Elephant Cookie | ELE01 | 12.34 | | 34 | No | No |
| fairycookie | Fairy Cookie | FAIRY01 | 23.34 | | | Yes | Yes |
| fancycookie | Fancy Cookie | FANCY01 | 1.68 | | | Yes | No |
| farflecookie | Farfle Cookie | FAR01 | 2.89 | | 234 | Yes | Yes |
| fridgecookie | Fridge Cookie | FRIDGE01 | 3.93 | | | Yes | No |

FIG. 4D

| | | | | | |
|---|---|---|---|---|---|
| gooeycookie | GOOEY01 | 19.79 | 12.50 | 34 | Yes | Yes |
| happycookie | HAPPY01 | 4.06 | | | No | Yes |
| heartcookie | HEART01 | 67.43 | | | Yes | Yes |
| heavycookie | HEAVY01 | 12.09 | | 34 | Yes | Yes |

Items per Page 25 ▾    Showing 1-25 of 200 | Previous | Next

Privacy Policy - Copyright Policy - Terms of Service - Help

FIG. 4D (cont.)

YAHOO! SMALL BUSINESS
*Merchant Solutions*

Welcome, yahoo_user
[ Sign Out, Account Info ]

Small Business Home - Yahoo! - Help

[ Mail ] [ Manage My Services ]

acmestore.com: Merchant Professional

Store Manager > Catalog Manager > Items > Customize View - Table Cookies

Customize View - Table Cookies

Here you can select the fields that appear when you view your items. Highlight whichever fields in the "Available Fields" list you would like to appear when you view your items, then click "Add." If you like, you can remove fields from view by highlighting them in the "Displayed Fields" list and clicking "Remove."

Available Fields
Headline
ISBN
Custom1
Custom2

Add >>
<< Remove

Displayed Fields
Name
ID
Code
Price
Sale-price
Ship-weight
Orderable
Taxable

[ Save ] [ Cancel ]

Privacy Policy - Copyright Policy - Terms of Service - Help

FIG. 4E

YAHOO! SMALL BUSINESS  Welcome, yahoo_user  Small Business Home - Yahoo! - Help
*Merchant Solutions*  [ Sign Out, Account Info ]

acmestore.com: Merchant Professional    [Mail] [Manage My Services]

Store Manager > Catalog Manager > Items > Add Item - TableX

Add Item - TableX

Please enter your item information in the fields below. Be sure to click "Save" or "Save and Add Another" when you're finished. (If you like, you can click on the question mark icons for additional information about each field.)

| Save | Save and Add Another | Cancel |

Fields marked with an asterisk (*) are required and cannot be left blank.

Mandatory Fields ⊙

ID *       ⊙ [_____]
Name *     ⊙ [_____]
Code *     ⊙ [_____]
Price *    ⊙ [_____]
Sale-price ⊙ [_____]
Ship-weight ⊙ [_____]
Orderable * ⊙ [Yes ▼]
Taxable *   ⊙ [Yes ▼]

Store Fields ⊙

Image   ⊙ [Upload] [None]
Options ⊙ [_____]
          (e.g., Color Black White "Sea Green")

FIG. 5A

Headline | Enter Individual Item Codes
Caption |
Abstract |
Icon | Upload | None
Inset | Upload | None
Label |
Download | Upload | None
Gift-certificate | No
Need-bill | No
Need-payment | No
Need-ship | No
Personalization-charge |
Availability | Not set
Shopping Fields
Product-url |
Yshopping-category | None Selected

FIG. 5A (cont.)

YAHOO! SMALL BUSINESS Merchant Solutions

Welcome, yahoo_user
[ Sign Out, Account Info ]

Small Business Home - Yahoo! - Help

[ Mail ] [ Manage My Services ]

acmestore.com: Merchant Professional

Store Manager > Catalog Manager > Items > Add Item - TableX > Options Codes

Add Item - Options Codes

Please enter a unique code for each option (or combination of options) in the list below. Be sure to select the appropriate option(s) for each code using the associated pulldown menu(s). If no code is available for a particular option, you may leave the code field for that option blank.

[ Save and Continue ] [ Cancel ]

| Code | Color | Size |
|------|-------|------|
| ____ | Red ▾ | S ▾ |
| ____ | Red ▾ | S ▾ |
| ____ | Red ▾ | S ▾ |
| ____ | Red ▾ | S ▾ |
| ____ | Red ▾ | S ▾ |
| ____ | Red ▾ | S ▾ |
| ____ | Red ▾ | S ▾ |
| ____ | Red ▾ | S ▾ |

[ Save and Continue ] [ Cancel ]

Privacy Policy - Copyright Policy - Terms of Service - Help

FIG. 5B

YAHOO! SMALL BUSINESS
*Merchant Solutions*

Welcome, yahoo_user
[ Sign Out, Account Info ]

Small Business Home - Yahoo! - Help

[Mail] [Manage My Services]

acmestore.com: Merchant Professional

Store Manager > Catalog Manager > Items > Edit Items

Edit Items

Please make whatever changes you like to your item information using the fields below. When you have finished, click "Save."

[Save] [Cancel]

| ID | Name | Code | Price | Sale-price | Ship-weight | Orderable | Taxable |
|---|---|---|---|---|---|---|---|
| alligatorcookie | Alligator Cookie | ALL01 | 5.00 | | 2 | Yes | Yes |
| alphabetcookie | Alphabet Cookie | ALP01 | 22.00 | | 5 | No | Yes |
| | A | ALP01A | | | | | |
| | B | ALP01B | | | | | |
| | C | ALP01C | | | | | |
| amaryliscookie | Amaryllis Cookie | AMA01 | 13.00 | | 89 | Yes | No |
| aphidcookie | Aphid Cookie | APH01 | 150.00 | | 12 | Yes | Yes |
| azurecookie | Azure Cookie | AZU01 | 2345.00 | 1000.00 | 9 | Yes | No |
| baxtercookie | Baxter Cookie | BAXTER01 | 1.25 | | 21 | Yes | Yes |
| biscuitcookie | Biscuit Cookie | BIS01 | 12.99 | | 89 | No | Yes |
| buckwheatcookie | Buckwheat Cookie | BUCK01 | 3.65 | | 12 | Yes | Yes |
| buttercookie | Butter Cookie | BUT01 | 8.20 | | 45 | Yes | Yes |
| cheesycookie | Cheesy Cookie | CHEESY01 | 4.30 | | 324 | Yes | Yes |
| chocolatechipcookie | Chocolate Chip Cookie | CHOCOCHIP01 | 2.95 | 1.25 | 45 | No | Yes |
| chocolatechocolatecookie | Chocolate Chocolate C | CHOCOCHOCO01 | 9.99 | | 98 | Yes | Yes |

FIG. 6A

| | | | | | |
|---|---|---|---|---|---|
| chocolatecookie | Chocolate Cookie | CHOCO01 | | 19.99 | | 89 | Yes | Yes |
| corncookie | Corn Cookie | CORN01 | | 99.99 | | | Yes | No |
| darkchocolatecookie | Dark Chocolate Cookie | DKCHOCO01 | 12.50 | 199.99 | | 234 | Yes | Yes |
| discuscookie | Discus Cookie | DIS01 | | 21.75 | | | No | No |
| elephantcookie | Elephant Cookie | ELE01 | | 12.34 | | 34 | Yes | No |
| fairycookie | Fairy Cookie | FAIRY01 | | 23.34 | | | Yes | Yes |
| fancycookie | Fancy Cookie | FANCY01 | | 1.68 | | | Yes | No |
| farflecookie | Farfle Cookie | FAR01 | | 2.89 | | 234 | Yes | Yes |
| fridgecookie | Fridge Cookie | FRIDGE01 | | 3.93 | | | Yes | No |
| gooeycookie | gooeycookie | GOOEY01 | 12.50 | 19.79 | | 34 | Yes | Yes |
| happycookie | Happy Cookie | HAPPY01 | | 4.06 | | | Yes | Yes |
| heartcookie | Heart Cookie | HEART01 | | 67.43 | | 34 | No | Yes |
| heavycookie | Heavy Cookie | HEAVY01 | | 12.09 | | | Yes | Yes |

Save | Cancel

Privacy Policy - Copyright Policy - Terms of Service - Help

FIG. 6A (cont.)

YAHOO! SMALL BUSINESS  Welcome, yahoo_user
Merchant Solutions  [ Sign Out, Account Info ]

Small Business Home - Yahoo! - Help

[ Mail ] [ Manage My Services ]

acmestore.com: Merchant Professional

Store Manager > Catalog Manager > Items > Delete Confirmation

Delete Confirmation

Are you sure that you would like to delete the item(s) below?

Please be aware that any changes you make are permanent and cannot be reversed. If the item you are trying to delete has any sub-items (listed below the item you are deleting) these will also be deleted.

Delete Checked Item(s):

| | ID | Name |
|---|---|---|
| ☑ | crackers | Crackers |
| | graham1 | Graham Crackers |
| | salty1 | Salty Crackers |
| | wheat1 | Wheat Crackers |
| | fire1 | Fire Crackers |
| ☑ | pb1 | Peanut Butter Cookies |
| ☑ | super2 | Super Cookies |
| ☑ | super1 | Peanut Butter Cookies |

[ Delete ]  [ Do Not Delete ]

Privacy Policy - Copyright Policy - Terms of Service - Help

FIG. 6B

YAHOO! SMALL BUSINESS
*Merchant Solutions*

Welcome, yahoo_user
[ Sign Out, Account Info ]

Small Business Home - Yahoo! - Help

[ Mail ] [ Manage My Services ]

acmestore.com: Merchant Professional

Store Manager > Catalog Manager > Items > Move Item(s)

Move Item(s)

You have chosen to move the item(s) listed below. Please select a new table for your items using the "To Table:" pulldown menu, then click "Continue" to move to the next step.

Move Checked Item(s):

| | ID | Name |
|---|---|---|
| ☑ | super1 | Super Cookies |
| ☑ | pb1 | Peanut Butter Cookies |
| ☑ | super2 | Super Cookies |
| ☑ | super1 | Peanut Butter Cookies |

To Table: [ Books ▼ ]

[ Continue ] [ Cancel ]

Privacy Policy - Copyright Policy - Terms of Service - Help

FIG. 6C

YAHOO! SMALL BUSINESS  Welcome, yahoo_user
Merchant Solutions  [ Sign Out, Account Info ]

Small Business Home - Yahoo! - Help

[Mail] [Manage My Services]

acmestore.com: Merchant Professional

Store Manager > Catalog Manager > Items > Change Prices

Change Prices

First select the Table using the "Choose Table" pull-down menu, then select the action: "Apply Discount" or "Clear Sale Prices." For the "Apply Discount" action, enter a number that will be applied as a percent discount to your items. When you have finished, click "Save."

Choose Table: [All Tables ▼]

Choose Action:  ○ Apply Discount: [    ] %
                ○ Clear Sale Prices

[Save] [Cancel]

Privacy Policy - Copyright Policy - Terms of Service - Help

FIG. 6D

YAHOO! SMALL BUSINESS
*Merchant Solutions*

Welcome, yahoo_user
[ Sign Out, Account Info ]

Small Business Home - Yahoo! - Help

[ Mail ] [ Manage My Services ]

acmestore.com: Merchant Professional

| Items | Inventory | Tables | Upload | Publishing |

Store Manager > Catalog Manager > Tables

Tables

All of your existing tables are listed below. To edit an existing table, click on its name in the "Table Name" column. To create a new table, click "Create New Table."

Create New Table /~ 719

[ Delete ] checked items

Check All - Clear All

| Table Name | Description | Items |
|---|---|---|
| ☐ Books | Table description goes here blah blah blah something about the table goes here blah blah books table | 135 |
| ☐ Cookies | Table description goes here... | 230 |
| ☐ Electronics | Table description goes here... | 230 |
| ☐ Furniture | Table description goes here... | 230 |
| ☐ Stationery | Table description goes here... | 230 |
| ☐ TableA | Table description goes here... | 230 |
| ☐ TableB | Table description goes here... | 230 |
| ☐ Underwear | Table description goes here... | 230 |
| ☐ Watches | Table description goes here... | 230 |

Check All - Clear All

[ Delete ] checked items

Privacy Policy - Copyright Policy - Terms of Service - Help

FIG. 7

YAHOO! SMALL BUSINESS *Merchant Solutions*

Welcome, yahoo_user
[ Sign Out, Account Info ]

Small Business Home - Yahoo! - Help

[ Mail ] [ Manage My Services ]

acmestore.com: Merchant Professional

Store Manager > Catalog Manager > Tables > Step 1 of 6: Create New Table - Table Name and Description

Step 1 of 6: Create New Table - Table Name and Description

You have chosen to create a new table. Tables allow you to group similar items together, so that you can manage them more efficiently. Tables are for your internal use only — the information you enter in the following steps will not be displayed to your customers.

Fields marked with an asterisk ( * ) are required and cannot be left blank.

Table Information

Table Name * [              ]
(e.g., Shirts)

Note: Table names cannot be edited once they are saved. Please choose your table name carefully.

Description [              ]
(e.g., All shirts and tops except T-shirts.)

[ Cancel ]                                          [ Next ]

Privacy Policy - Copyright Policy - Terms of Service - Help

FIG. 8A

YAHOO! SMALL BUSINESS
*Merchant Solutions*

Welcome, yahoo_user
[ Sign Out, Account Info ]

Small Business Home - Yahoo! - Help

[ Mail ] [ Manage My Services ]

acmestore.com: Merchant Professional

Store Manager > Catalog Manager > Tables > Step 2 of 6: Create New Table - Mandatory Fields

Step 2 of 6: Create New Table - Mandatory Fields

Now it's time to configure the fields that will be available to you when you add items to your new table. The fields below are required for all tables. If you like, you can choose to make the sale-price and ship-weight fields required (which means that an item can't be created in this table unless the field is filled in). You can also choose whether any of the fields below should be pre-populated with a default value.

Mandatory Fields

| Field Name | Format | Required | Default Value |
|---|---|---|---|
| ID | Text | ✓ | Not applicable |
| Name | Text | ✓ | |
| Code | Text | ✓ | Not applicable |
| Price | Numbers | ✓ | |
| Sale-price | Numbers | ☐ | |
| Ship-weight | Numbers | ☐ | |
| Orderable | Orderable | ✓ | Yes ▾ |
| Taxable | Yes-no | ✓ | Yes ▾ |

Total Fields                                                                  8 used of 50 available

[ Cancel ]                                                        [ Previous ]  [ Next ]

Privacy Policy - Copyright Policy - Terms of Service - Help

FIG. 8B

YAHOO! SMALL BUSINESS
Merchant Solutions

Welcome, yahoo_user
[ Sign Out, Account Info ]

Small Business Home - Yahoo! - Help

Mail | Manage My Services acmestore.com: Merchant Professional

Store Manager > Catalog Manager > Tables > Step 3 of 6: Create New Table - Store Fields

Step 3 of 6: Create New Table - Store Fields

The following fields are optional. Select the fields you would like to be available to you when you add items to your new table. As on the previous page, you can choose whether these fields are required and whether you would like them to be pre-populated with a default value.

Store Fields ○

| Include ○ | Field Name ○ | Format ○ | Required ○ | Default Value ○ |
|---|---|---|---|---|
| Check All - Clear All | | | | |
| ☐ | Image | Image | ☐ | Not applicable |
| ☐ | Options | Med-text | ☐ | [   ] |
| ☐ | Headline | Med-text | ☐ | [   ] |
| ☐ | Caption | Big-text | ☐ | [   ] |
| ☐ | Abstract | Med-text | ☐ | [   ] |
| ☐ | Icon | Image | ☐ | Not applicable |
| ☐ | Inset | Image | ☐ | Not applicable |
| ☐ | Label | Med-text | ☐ | [   ] |
| ☐ | Download | File | ☐ | Not applicable |
| ☐ | Gift-certificate | Yes-no | ✓ | |

FIG. 8C

| | | |
|---|---|---|
| ☐ | Need-bill | Yes-no [No ▼] |
| ☐ | Need-payment | Yes-no [Yes ▼] |
| ☐ | Need-ship | Yes-no [Yes ▼] |
| ☐ | Personalization-charge Number | [Yes ▼] |
| ☐ | Availability | Text [Not set ▼] |

Total Fields 19 used of 50 available

[Cancel]  [Previous] [Next]

Privacy Policy - Copyright Policy - Terms of Service - Help

FIG. 8C (cont.)

YAHOO! SMALL BUSINESS
*Merchant Solutions*

Welcome, yahoo_user
[ Sign Out, Account Info ]

Small Business Home - Yahoo! - Help

[ Mail ] [ Manage My Services ]

acmestore.com: Merchant Professional

Store Manager > Catalog Manager > Tables > Step 4 of 6: Create New Table - Shopping Fields

Step 4 of 6: Create New Table - Shopping Fields

The following optional fields are often used in conjunction with Yahoo! Shopping. Select whichever fields you would like to be available to you when you add items to your new table. As on the previous pages, you can choose whether these fields are required and whether you would like them to be pre-populated with a default value.

Shopping Fields

| Include | Field Name | Format | Required | Default Value |
|---|---|---|---|---|
| Check All - Clear All | | | | |
| ☐ | Product-url | Text | ☐ | |
| ☐ | Yshopping-category | Text | ☐ | None Selected |
| ☐ | Merchant-category | Text | ☐ | |
| ☐ | Ypath | Text | ☐ | |
| ☐ | Upc | Text | ☐ | |
| ☐ | Style-number | Text | ☐ | |
| ☐ | Style | Text | ☐ | |
| ☐ | Isbn | Text | ☐ | |
| ☐ | Ean | Text | ☐ | |
| ☐ | Condition | Text | ☐ | New |
| ☐ | Classification | Text | ☐ | New |
| ☐ | Manufacturer | Text | ☐ | |
| ☐ | Model-number | Text | ☐ | |
| ☐ | Manufacturer-part-number | Text | ☐ | |
| ☐ | In-yshopping | Yes-no | ☑ | Yes |

FIG. 8D

Brand

Text 19 used of 50 available

Total Fields

Cancel   Previous   Next

Privacy Policy - Copyright Policy - Terms of Service - Help

FIG. 8D (cont.)

YAHOO! SMALL BUSINESS
*Merchant Solutions*

Welcome, yahoo_user
[ Sign Out, Account Info ]

Small Business Home - Yahoo! - Help

[ Mail ] [ Manage My Services ]

acmestore.com: Merchant Professional

Store Manager > Catalog Manager > Tables > Step 5 of 6: Create New Table - Custom Fields

Step 5 of 6: Create New Table - Custom Fields

If you like, you can create custom fields that will be available to you when you add items to your new table. For each custom field, enter a unique field name and then select a format using the pulldown menu. As on the previous pages, choose whether these fields are required and whether you would like them to be pre-populated with a default value.

Custom Fields

| Field Name | Format | Required | Default Value |
|---|---|---|---|
| | Text ▼ | ☐ | |
| | Text ▼ | ☐ | |
| | Text ▼ | ☐ | |
| | Text ▼ | ☐ | |
| | Text ▼ | ☐ | |

Add Another Custom Field

Total Fields 19 used of 50 available

[ Cancel ] [ Previous ] [ Next ]

Privacy Policy - Copyright Policy - Terms of Service - Help

FIG. 8E

YAHOO! SMALL BUSINESS  Welcome, yahoo_user      Small Business Home - Yahoo! - Help
Merchant Solutions    [ Sign Out, Account Info ]

[ Mail ]  [ Manage My Services ]

acmestore.com: Merchant Professional

Store Manager > Catalog Manager > Tables > Step 6 of 6: Create New Table - Review Your Information

Step 6 of 6: Create New Table - Review Your Information

Please review your new table information below. Click on the "Edit" buttons to make any necessary changes. Once you're satisfied with your work, click "Save" to add your new table.

Table Name and Description                                    [Edit]— 810

Table Name *    Books
Description     Blah blah blah this is the description about books blah blah blah

* Reminder: The table name cannot be edited once you save your table.

Mandatory Fields                                              [Edit]— 810

| Field Name  | Format    | Required | Default Value    |
|-------------|-----------|----------|------------------|
| ID          | Text      | ✓        | (None specified) |
| Name        | Text      | ✓        | (None specified) |
| Code        | Text      | ✓        | (Not applicable) |
| Price       | Numbers   | ✓        | (None specified) |
| Sale-price  | Numbers   |          | (None specified) |
| Ship-weight | Numbers   |          | (None specified) |
| Orderable   | Orderable | ✓        | Yes              |
| Taxable     | Yes-no    | ✓        | No               |

Store Fields                                                  [Edit]— 810

| Field Name | Format   | Required | Default Value    |
|------------|----------|----------|------------------|
| Image      | Image    | ✓        | (Not applicable) |
| Options    | Med-text |          | (None specified) |
| Headline   | Med-text | ✓        | (None specified) |
| Caption    | Big-text |          | (None specified) |
| Abstract   | Med-text |          | Blah blah blah blah blah |

FIG. 8F

Shopping Fields

| Field Name | Format | Required | Default Value | |
|---|---|---|---|---|
| Isbn | text | | (None specified) | |
| In-yshopping | yes-no | ✓ | Yes | Edit — 810 |

Custom Fields

| Field Name | Format | Required | Default Value | |
|---|---|---|---|---|
| Format | Text | ✓ | Paperback | |
| Genre | Text | | (None specified) | Edit — 810 |

Total Fields 17 used of 50 available

Cancel    Previous  Save

Privacy Policy - Copyright Policy - Terms of Service - Help

FIG. 8F (cont.)

| | | | |
|---|---|---|---|
| Headline | Med-text | | (None specified) |
| Caption | Big-text | | (None specified) |
| Abstract | Med-text | | Blah blah blah blah blah |

Shopping Fields

| Field Name | Format | Required | Default Value | |
|---|---|---|---|---|
| Isbn | text | ✓ | (None specified) | Edit |
| In-yshopping | yes-no | ✓ | Yes | |

Custom Fields

| Field Name | Format | Required | Default Value | |
|---|---|---|---|---|
| Format | Text | ✓ | Paperback | Edit |
| Genre | Text | ✓ | (None specified) | |

Total Fields                 17 used of 50 available

Save | Cancel

Privacy Policy - Copyright Policy - Terms of Service - Help

FIG. 9A (cont.)

YAHOO! SMALL BUSINESS
*Merchant Solutions*

Welcome, yahoo_user
[ Sign Out, Account Info ]

Small Business Home - Yahoo! - Help

[ Mail ] [ Manage My Services ]

acmestore.com: Merchant Professional

Store Manager > Catalog Manager > Upload

| Items | Inventory | Tables | Upload | Publishing |

Upload

Click "Upload" to upload a spreadsheet containing revisions to your items. Once you have uploaded your spreadsheet and addressed any critical errors, click "Commit" to apply your changes to the database. (When the "Revert" button is active, you may revert to the last saved version of your catalog.) Click "Download" to download a spreadsheet containing your existing item information.

[ Upload ] [ Commit ] [ Revert ]                                    [ Download ]

Upload History

You have not uploaded any database files. Click on Upload to start.

Privacy Policy - Copyright Policy - Terms of Service - Help

FIG. 10A

YAHOO! SMALL BUSINESS
*Merchant Solutions*

Welcome, yahoo_user
[ Sign Out, Account Info ]

Small Business Home - Yahoo! - Help

[ Mail ] [ Manage My Services ]

acmestore.com: Merchant Professional

Store Manager > Catalog Manager > Upload > Upload Table

Upload Table

Use the pulldown menu below to select the table to which you would like to upload your spreadsheet. Select "Add" to append your changes to your existing table or "Rebuild" to overwrite your existing table. Click "Browse" to locate the spreadsheet file on your computer's hard drive, and click "Upload" to continue.

Choose Table: [ Books ▼ ]

Choose Action: ○ Add
○ Rebuild

Choose File: [ _____ ] Browse...

[ Upload ] [ Cancel ]

Privacy Policy - Copyright Policy - Terms of Service - Help

FIG. 10B

YAHOO! SMALL BUSINESS
*Merchant Solutions*

Welcome, yahoo_user
[ Sign Out, Account Info ]

Small Business Home - Yahoo! - Help

[ Mail ] [ Manage My Services ]

acmestore.com: Merchant Professional

Store Manager > Catalog Manager > Upload

| Items | Inventory | Tables | Upload | Publishing |

Upload

Click "Upload" to upload a spreadsheet containing revisions to your items. Once you have uploaded your spreadsheet and addressed any critical errors, click "Commit" to apply your changes to the database. (When the "Revert" button is active, you may revert to the last saved version of your catalog.) Click "Download" to download a spreadsheet containing your existing item information.

[ Upload ] [ Commit ] [ Revert ]

[ Download ]

Upload History

| Event | Detail |
|---|---|
| Thu Feb 27 20:47:09 2003 Database Upload | TableOne uploaded<br>Field names=(:ID :CODE :NAME :PRICE :AGE)<br>50 records loaded |

Warnings and Errors

Warning - Field 'age' will not be used (objtype =:ITEM.)

| Record | Detail |
|---|---|
| 4 [Hide] | WARNING: Wrong number of fields detected(4 instead 5) |
| ID: up3 | |
| Name: New Item | |
| Code: up3 | |
| Price: 5 | |
| Age: (will not be used for objtype =:ITEM.) | |
| 5 [Show] | WARNING: Wrong number of fields detected(5 instead 6) |

FIG. 10C

View Records

Viewing 1 of 200

| | |
|---|---|
| ID | supercookie |
| Name | Super Cookies |
| Code | supercookie01 |
| Price | 5.00 |
| Orderable | Yes |
| Taxable | Yes |

Previous | Next

Jump to # [    ] Go!

Privacy Policy - Copyright Policy - Terms of Service - Help

FIG. 10C (cont.)

YAHOO! SMALL BUSINESS  Welcome, yahoo_user    Small Business Home - Yahoo! - Help
*Merchant Solutions*  [ Sign Out, Account Info ]

[ Mail ]  [ Manage My Services ]

acmestore.com: Merchant Professional

Store Manager > Catalog Manager > Upload

| Items | Inventory | Tables | Upload | Publishing |

Upload

Click "Upload" to upload a spreadsheet containing revisions to your items. Once you have uploaded your spreadsheet and addressed any critical errors, click "Commit" to apply your changes to the database. (When the "Revert" button is active, you may revert to the last saved version of your catalog.) Click "Download" to download a spreadsheet containing your existing item information.

[ Download ]

[ Upload ] [ Commit ] [ Revert ]

Upload History

| Event | Detail |
|---|---|
| Thu Feb 27 20:47:09 2003 Database Upload | TableOne uploaded<br>Field names=(:ID :CODE :NAME :PRICE :AGE)<br>50 records loaded |

Warnings and Errors

| Record | Detail |
|---|---|
| 4 [Show] | WARNING: Wrong number of fields detected(5 instead 6) |
| 5 [Show] | WARNING: Wrong number of fields detected(5 instead 6) |

View Records

Viewing 1 of 200    Previous | Next    Jump to # [    ] [ Go! ]

| ID | supercookie |
| Name | Super Cookies |
| Code | supercookie01 |
| Price | 5.00 |

FIG. 10D

Orderable    Yes
Taxable      Yes

Privacy Policy - Copyright Policy - Terms of Service - Help

FIG. 10D (cont.)

YAHOO! SMALL BUSINESS Welcome, yahoo_user  
Merchant Solutions [ Sign Out, Account Info ]

Small Business Home - Yahoo! - Help

[Mail] [Manage My Services]

acmestore.com: Merchant Professional

Store Manager > Catalog Manager > Inventory

| Items | Inventory | Tables | Upload | Publishing |

Inventory - Cookies

Use the "View:" pulldown menu below to choose the table whose inventory you would like to view or edit. Click "Edit" to edit your item quantities. Click "Upload" to upload a spreadsheet with revised item quantities. Click "Download" to download a spreadsheet containing your current item quantities.

View: [Cookies ▼]

[Upload] [Download]

Edit

1216

Items per Page [25 ▼]  Showing 1-25 of 200 | Previous | Next

| ID | Name | Code | Quantity |
|---|---|---|---|
| alligatorcookie | Alligator Cookie | ALL01 | 5 |
| alphabetcookie | Alphabet Cookie | ALP01 | 22 |
| amarylliscookie | Amaryllis Cookie | AMA01 | 13 |
| aphidcookie | Aphid Cookie | APH01 | 150 |
| azurecookie | Azure Cookie | AZU01 | 2345 |
| baxtercookie | Baxter Cookie | BAXTER01 | 1 |
| biscuitcookie | Biscuit Cookie | BIS01 | 12 |
| buckwheatcookie | Buckwheat Cookie | BUCK01 | 3 |
| buttercookie | Butter Cookie | BUT01 | 8 |
| cheesycookie | Cheesy Cookie | CHEESY01 | 4 |
| chocolatechipcookie | Chocolate Chip Cookie | CHOCOCHIP01 | 2 |
| chocolatechocolatecookie | Chocolate Chocolate Cookie | CHOCOCHOCO01 | 9 |
| chocolatecookie | Chocolate Cookie | CHOCO01 | 19 |
| corncookie | Corn Cookie | CORN01 | 99 |
| darkchocolatecookie | Dark Chocolate Cookie | DKCHOCO01 | 199 |
| discuscookie | Discus Cookie | DIS01 | 21 |

FIG. 12A

| | | |
|---|---|---|
| elephantcookie | Elephant Cookie | ELE01 | 12 |
| fairycookie | Fairy Cookie | FAIRY01 | 23 |
| fancycookie | Fancy Cookie | FANCY01 | 1 |
| farflecookie | Farfle Cookie | FAR01 | 2 |
| fridgecookie | Fridge Cookie | FRIDGE01 | 3 |
| gooeycookie | gooeycookie | GOOEY01 | 19 |
| happycookie | Happy Cookie | HAPPY01 | 4 |
| heartcookie | Heart Cookie | HEART01 | 67 |
| heavycookie | Heavy Cookie | HEAVY01 | 12 |

Edit

View: [All Tables ▼]   Items per Page [25 ▼]   Showing 1-25 of 200 | Previous | Next

[Upload]   [Download]

Privacy Policy - Copyright Policy - Terms of Service - Help

FIG. 12A (cont.)

| | | |
|---|---|---|
| corncookie | Corn Cookie | CORN01 · 12 |
| darkchocolatecookie | Dark Chocolate Cookie | DKCHOCO01 · 234 |
| discuscookie | Discus Cookie | DIS01 · 23 |
| elephantcookie | Elephant Cookie | ELE01 · 34 |
| fairycookie | Fairy Cookie | FAIRY01 · 55 |
| fancycookie | Fancy Cookie | FANCY01 · 12 |
| farflecookie | Farfle Cookie | FAR01 · 234 |
| fridgecookie | Fridge Cookie | FRIDGE01 · 98 |
| gooeycookie | gooeycookie | GOOEY01 · 34 |
| happycookie | Happy Cookie | HAPPY01 · 7 |
| heartcookie | Heart Cookie | HEART01 · 34 |
| heavycookie | Heavy Cookie | HEAVY01 · 66 |

Items per Page 25 ▼  Showing 1-25 of 200 | Previous | Next

Save  Cancel

Privacy Policy - Copyright Policy - Terms of Service - Help

FIG. 12B (cont.)

YAHOO! SMALL BUSINESS
*Merchant Solutions*

Welcome, yahoo_user
[ Sign Out, Account Info ]

Small Business Home - Yahoo! - Help

[ Mail ] [ Manage My Services ]

acmestore.com: Merchant Professional

Store Manager > Catalog Manager > Publishing

| Items | Inventory | Tables | Upload | Publishing |

Publishing

[ Publish Catalog ]

Click "Publish Changes" to update your catalog with whatever modifications you have made since last publishing your catalog. Any changes you have made to existing items will be reflected on your site immediately. If you have added or removed any items from your catalog, please remember to update your site accordingly.

Publish History

| Event | Detail |
|---|---|
| Sun April 6 13:24:35 2003<br>Catalog Publish | All tables published.<br>No errors. |

Privacy Policy - Copyright Policy - Terms of Service - Help

SELF-SERVICE CATALOG MANAGER FOR STORES IMPLEMENTED ON A COMMUNICATIONS NETWORK

CROSS-REFERENCE TO RELATED APPLICATION

This application claims priority under 35 U.S.C. § 119(e) to U.S. Provisional Patent Application Ser. No. 60/504,577, "Self-Service Catalog Manager For Stores Implemented On A Communications Network," filed Sep. 19, 2003. The subject matter of the foregoing is incorporated herein by reference in its entirety.

BACKGROUND OF THE INVENTION

1. Field of the Invention

This invention relates generally to catalog management for stores implemented on a communications network, for example as can be used to assist merchants to manage catalogs for Internet stores.

2. Description of the Related Art

The transfer of information over computer networks has become an increasingly important means by which institutions, corporations, and individuals do business. Computer networks have grown over the years from independent and isolated entities established to serve the needs of a single group into vast internets that interconnect disparate physical networks and allow them to function as a coordinated system. Currently, the largest computer network in existence is the Internet. The Internet is a worldwide interconnection of computer networks that communicate using a common protocol. Millions of computers, from low-end personal computers to high-end super computers, are connected to the Internet.

The Internet has evolved to serve a variety of interests and forums. In particular, the Internet is rapidly transforming into a global electronic marketplace of goods and services as well as of ideas and information. This transformation of the Internet into a global marketplace was driven in large part by the introduction of an information system known as the World Wide Web ("the web"). The web is a distributed database designed to give wide access to a large universe of documents. The database records of the web are in the form of documents known as web pages. These web pages typically reside on web servers and are accessible via the Internet. Computers connected to the Internet may access the web pages via a program known as a web browser, which has a powerful, simple-to-learn graphical user interface. One powerful technique supported by the web browser is known as hyperlinking, which permits web page authors to create links to other web pages that users can then retrieve by using simple point-and-click commands on the web browser.

Web pages may be constructed in any of a variety of formatting conventions, such as Hyper Text Markup Language (HTML), and may include multimedia information content such as graphics, audio, and moving pictures. Any person with a computer and a connection to the Internet may access any publicly accessible web page. Thus, a presence on the World Wide Web (e.g., an Internet store) has the capability to introduce a worldwide base of consumers to businesses, individuals, institutions and other merchants seeking to advertise their products and services to potential customers. Furthermore, the ever increasing sophistication in the design of web pages and supporting infrastructure, made possible by the exponential increase in data transmission rates and computer processing speeds, makes the web an increasingly attractive medium for these stores.

The availability of powerful new tools that facilitate the development and distribution of Internet content has led to a proliferation of information, products, and services offered on the Internet and dramatic growth in the number of consumers and merchants using the Internet. Commerce conducted over the Internet has grown and is expected to continue to grow dramatically. As a result, the Internet has emerged as an attractive new medium for merchants offering various products and services to reach these large numbers of consumers.

In particular, small businesses, especially those that address highly targeted niche markets, may benefit substantially from a store presence on the Internet (or other similar computer network). The cost of a store and advertising on the Internet can be low compared to other alternatives, and merchants potentially can reach a very wide audience (or a highly targeted audience). However, existing technology for supporting stores, especially administrative functions such as catalog management, are not well suited for smaller merchants. Much of the existing technology is targeted for managing catalogs and inventory for very large merchants. This technology tends to be too expensive for smaller merchants to afford and unnecessarily complex for them to use. In particular, it is often desirable for smaller merchants to have self-serve capability to manage their catalogs and perform other administrative functions. Currently available technology is not well suited for this application.

Thus, there is a need for new approaches to catalog management and other administrative functions in order to better serve these merchants.

SUMMARY OF THE INVENTION

The present invention overcomes the limitations of the prior art by providing a computerized self-service platform that assists merchants in creating and managing stores on a computer network, such as the Internet. The self-service aspect is beneficial because it reduces the cost of administering stores. It also increases operational flexibility. In one implementation, changes to the store can be made at any time and in real-time or near real-time, thus allowing the merchant to respond more rapidly to changing conditions.

In one aspect of the invention, a system for managing a store includes a product database and an ecommerce storefront. The product database stores information concerning items (including services and other non-product offerings) offered for sale through the store. The ecommerce storefront stores information concerning the presentation of the store to customers (i.e., the storefront). Some of the storefront information references information stored in the product database. A product administration module allows the merchant (or other users) to manage the product database on a self-serve basis. Separating the storefront from the product database has numerous advantages. For example, each part can now be handled by different people (e.g., a database administrator for the product database and a web designer for the storefront). The separation also makes it easier to reuse components. For example, some or all of a product database that is built for one store can potentially be reused with a different storefront having an entirely different look and feel.

In one specific implementation, the store is implemented on the Internet. The product database is divided into two parts: a product catalog and inventory records. The user can administer the product catalog and inventory records via a self-serve catalog manager that is accessible through a URL. The storefront includes web pages, which are served to customers by an ecommerce server. The web pages can contain store tags, which reference information from the product catalog and/or inventory records. A store tag server is used to resolve the store tags.

In another aspect of the invention, the product database stores its information in the form of tables. Each table is organized into items and items may have options. In one specific data structure, each row in a table corresponds to one item and options for an item are encoded and stored as a single entry in the row. However, inventory preferably is tracked separately for each option. For example, if one item is a certain type of shirt and the options are different sizes, a single web page can be built with respect to the item but inventory is tracked separately for each shirt size.

Other aspects of the invention include subsystems, data structures and methods related to the systems described above.

BRIEF DESCRIPTION OF THE DRAWING

The invention has other advantages and features which will be more readily apparent from the following detailed description of the invention and the appended claims, when taken in conjunction with the accompanying drawing, in which:

FIGS. 4A-4E are graphical depictions of web pages for viewing items in a catalog.

FIGS. 5A-5B are graphical depictions of web pages for adding an item to a catalog.

FIGS. 6A-6D are graphical depictions of web pages for editing an item in a catalog.

FIG. 7 is a graphical depiction of a web page for viewing tables in a catalog.

FIGS. 8A-8F are graphical depictions of web pages for adding a table to a catalog.

FIGS. 10A-10D are graphical depictions of web pages for importing data to a catalog.

FIGS. 12A-12B are graphical depictions of web pages for managing inventory of items in a catalog.

FIG. 13 is a graphical depiction of a web page verifying publication of a catalog.

DETAILED DESCRIPTION OF THE PREFERRED EMBODIMENTS

Figure 1:
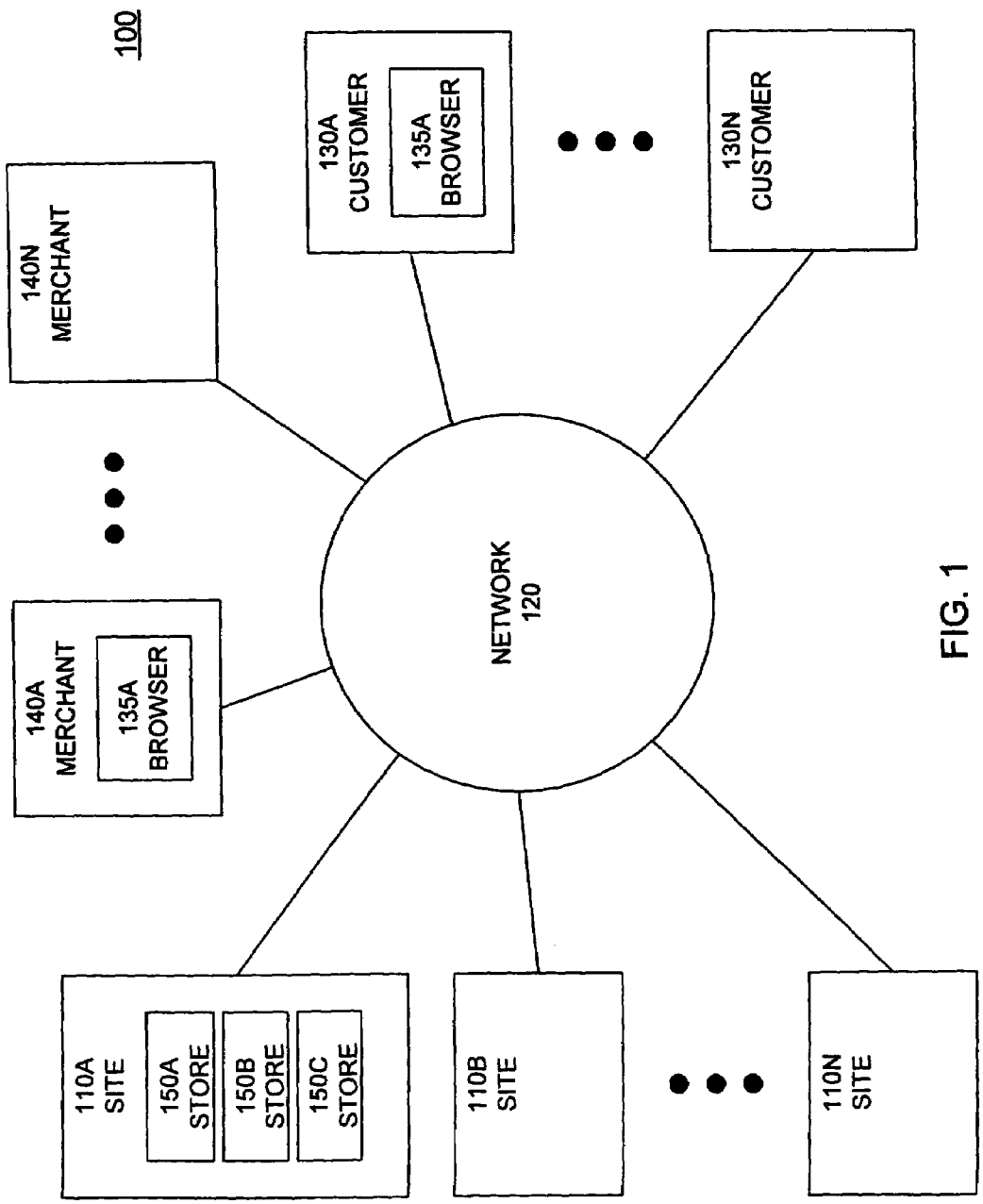
FIG. 1 is a block diagram of an example system suitable for use with the present invention.

FIG. 1 is a block diagram of an example system 100 suitable for use with the present invention. Generally speaking, the system 100 includes a number of sites 110A-N, customers 130A-N and merchants 140A-N that communicate with each other over a network 120. The merchants 140 maintain stores 150A-N on the sites 110. The customers 130 shop at the stores 150 via their storefronts on the sites 110. The merchants 140 access the stores 150 (e.g., to perform administrative functions) via a self-service platform, which can be implemented as part of a site 110.

In one specific embodiment, the network 120 is the Internet. The sites 110 include web sites, for example Yahoo! Store. The customers 130 include individuals who access the Internet, typically by web browsers 135 such as Netscape's Navigator or Microsoft's Internet Explorer. The merchants 140 maintain Internet stores 150, which are hosted on the sites 110. The host site may be maintained by the merchant itself or by a third party (e.g., Yahoo!). Each site 110 may contain multiple stores 150. The merchants 140 typically access the self-service platform (implemented on sites 110) by web browsers 135. In some cases, the customers 130 and merchants 140 can access the sites 110 using other means, for example by software agents, programmatic interfaces or communications channels outside of the network 120. The customers 130 shop at the stores 150 via the Internet, primarily by requesting web pages from the sites 110 and/or submitting forms to the site 110.

FIG. 1 is simplified for clarity. For example, the sites 110, customers 130 and merchants 140 are shown as separate entities. In fact, the same entity may play one or more roles. Entities may also take on different roles in different contexts. In addition, the different roles can be distributed and/or divided among many different entities. The site 110 itself may also be distributed for redundancy and/or performance reasons. For example, large sites such as Yahoo! sites typically run different web properties from different servers and may use for example multiple servers, databases, load balancers, etc.

As further clarification, although the Internet will be used as the primary example in this disclosure, the invention may be used with other systems also, for example some POS systems or in store retail systems. For example, the entities 110, 130 and 140 may communicate with each other over separate communications networks or dedicated communications channels, rather than (or in addition to) the common network 120 of FIG. 1. Alternately, various parts of system 100 may be implemented by mobile components and may not be permanently attached to a communications network. For example, entities may interact with each other via a wireless connection. As a final example, the pages can be based on protocols other than the web.

Figure 2:
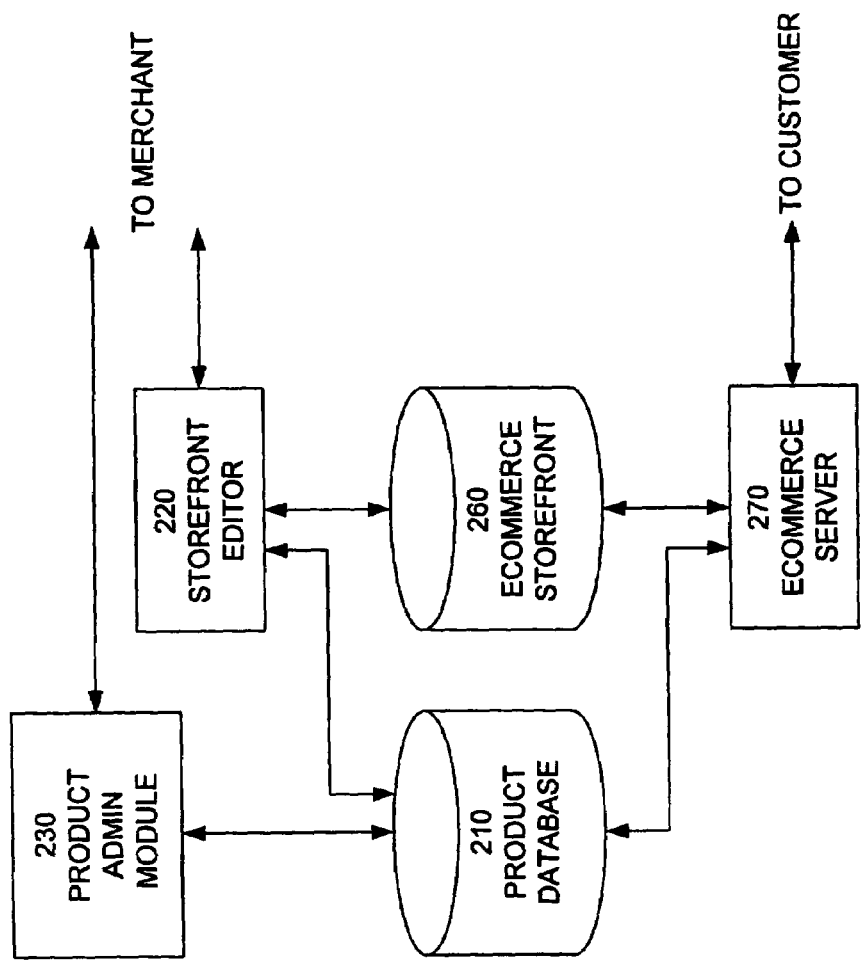
FIG. 2 is a block diagram of an example implementation of a store of FIG. 1.

FIG. 2 is a block diagram of an example implementation of a store, based on the Internet scenario described above. The storefront for the store is the presentation of the store to the customer. Other parts of the store include administrative functions (such as maintaining a catalog of items for sale in the store, inventory available for each item, and pricing) and back-end processing (such as credit card processing and generation of invoices, as applicable).

In FIG. 2, information about the store is stored in two databases 210 and 260. The product database 210 ("product" is meant to also include services and other non-product offerings) includes information about the store catalog, such as items available for sale, SKU number, different options for each SKU, inventory available, pricing, etc. In one approach, the product database is organized as tables, each table having fields that can vary from table to table. Each table contains items, with items typically defined by SKU number. Differences within a single SKU number typically appear as options within one item. For example, one table might be Apparel. Items in the Apparel table might include different types of sweaters, shirts, pants, etc. The fields in this table might include SKU, designer label, price, etc. Options for apparel might include size and color, with inventory listed separately for each option. Another table might be Books, with each item being a different title. Fields in the Books table might include ISBN number, hardback vs. paperback, author, publisher, etc.

Using multiple tables makes it easier to define different fields for each table. For example, if only a single table were used, the ISBN number field would be defined for all items, even though it is a meaningless field for Apparel items. It would be wasted space in the product database 210. The use of options to further subdivide an item also results in efficiency. For example, if one type of sweater is to be placed on sale, this can be achieved by editing the catalog with respect to the item in its entirety, rather than individually editing the catalog entries for each size, color, etc. Furthermore, there can be a single presentation of the item in the storefront (e.g., one image is used to show a certain style of sweater, rather than having different images for every size and color), although inventory and/or pricing are maintained separately for each option. Other groupings can also be supported. For example, groups can be defined as including certain items and/or options (or other groups). Manipulating the group then affects the individual members in the group. For example, the group Sharks Apparel can be defined to include Apparel items with the San Jose Sharks branding. When the Sharks season ends, the group in its entirety can be placed on sale.

The ecommerce storefront 260 includes information about the storefront, such as the actual pages to be served to shopping customers. In one embodiment, the web pages access information in the product database 210 by using store tags, as will be further described below. For example, on the web page displaying a book, rather than hardwiring "$25.99" in the HTML for the web page, the store tag that points to the book price in the product database 210 can be used instead. Thus, if the price is changed in the product database 210, it is automatically updated on the web page also. One advantage of using store tags (dynamic elements in a static page) to accomplish this task, as opposed to a web page that is dynamically generated, is that it has a static URL. Many web crawlers cannot index pages that are generated in response to queries since the web crawler itself does not generate queries. Thus, using store tags allows the page to be indexed.

Separating the storefront from the product catalog has numerous advantages. For example, managing the product catalog and building the storefront requires two different skill sets. By separating these tasks, each can be handled by specialists with the appropriate skill sets and using specialized tools. The separation can also lead to the reuse of components. For example, some or all of a product catalog that is built for one store can potentially be reused with a different storefront having an entirely different look and feel. To take this one step further, many stores will have common elements, either with respect to their catalogs or with respect to the functionality of their storefronts. Templates can be developed to exploit these commonalities, thus allowing merchants to quickly build their stores. Additionally, this allows for catalog data elements to be referenced from not just an associated storefront in the same hosting environment, but also from other sources such as a storefront in a different hosting environments (e.g., if the web servers have been modified to access the catalog data via store tags) and aggregated shopping environments where customers can browse products from different merchants.

Returning to FIG. 2, customers 130 access the store via the ecommerce server 270, which serves the appropriate web pages. The ecommerce server 270 can be a web hosting server. The ecommerce server 270 retrieves the desired web pages from the database 260 and can also access the product database 210 as needed, for example to resolve store tags in the HTML.

Merchants 140 can access the store via the product administration module 230 and the storefront editor 220. The storefront editor 220 is a tool used to manage the presentation of the store site. For example, changes to the look and feel of the storefront (i.e., the web pages making up the storefront) can be made via the storefront editor 220. The editor 220 can access the product database 210 as needed. In some implementations, this tool can perform the combined actions of managing presentation of the product data and the data itself. The product administration module 230 is a tool used to manage the product database. Changes to the items listed in the catalog, pricing, etc. can be made via the administration module 230.

The administration module 230 preferably is self-serve, meaning that the merchant can access the administration module 230 himself and make changes needed to the product database 210. This is especially beneficial for smaller merchants. It often is not cost effective for personnel to directly support the administrative activities of smaller merchants. Yet, smaller merchants must have the ability to maintain their catalogs. The self-service aspect reduces the administrative cost by allowing smaller merchants to help themselves. The self-service aspect also allows the merchant to more easily and more immediately change his catalog. If the overall system is real-time or near real-time, as is the case in this example, any changes made by the merchant will be reflected immediately or near-immediately in his storefront.

In one implementation, the components shown in FIG. 2 are not implemented separately for each store. Rather, multiple merchants share many common components. For example, each merchant 140 does not have a dedicated storefront editor 220, administration module 230, or ecommerce server 270. These components are used to support all stores hosted by a site. Each merchant 140 also does not have a dedicated database 210 and 260. Rather, common databases are used but each merchant 140 has a dedicated section within the common databases.

FIGS. 3-13 are graphical depictions of web pages that illustrate an example user interface for the product administration module 230. This self-service platform allows users 140 to manage their catalogs. This particular example is in the context of catalogs for stores hosted by Yahoo! Store, but the invention is not limited to this specific example. In the example of FIGS. 3-13, the self-service platform is referred to as Catalog Manager, which is located on the Yahoo! Store site. In an alternate implementation, the self-service platform is located on a site run by a different entity (e.g., a service provider to Yahoo!). Alternately, the self-service platform can manage catalogs and/or perform administrative functions for stores maintained on many different sites.

Figure 3:
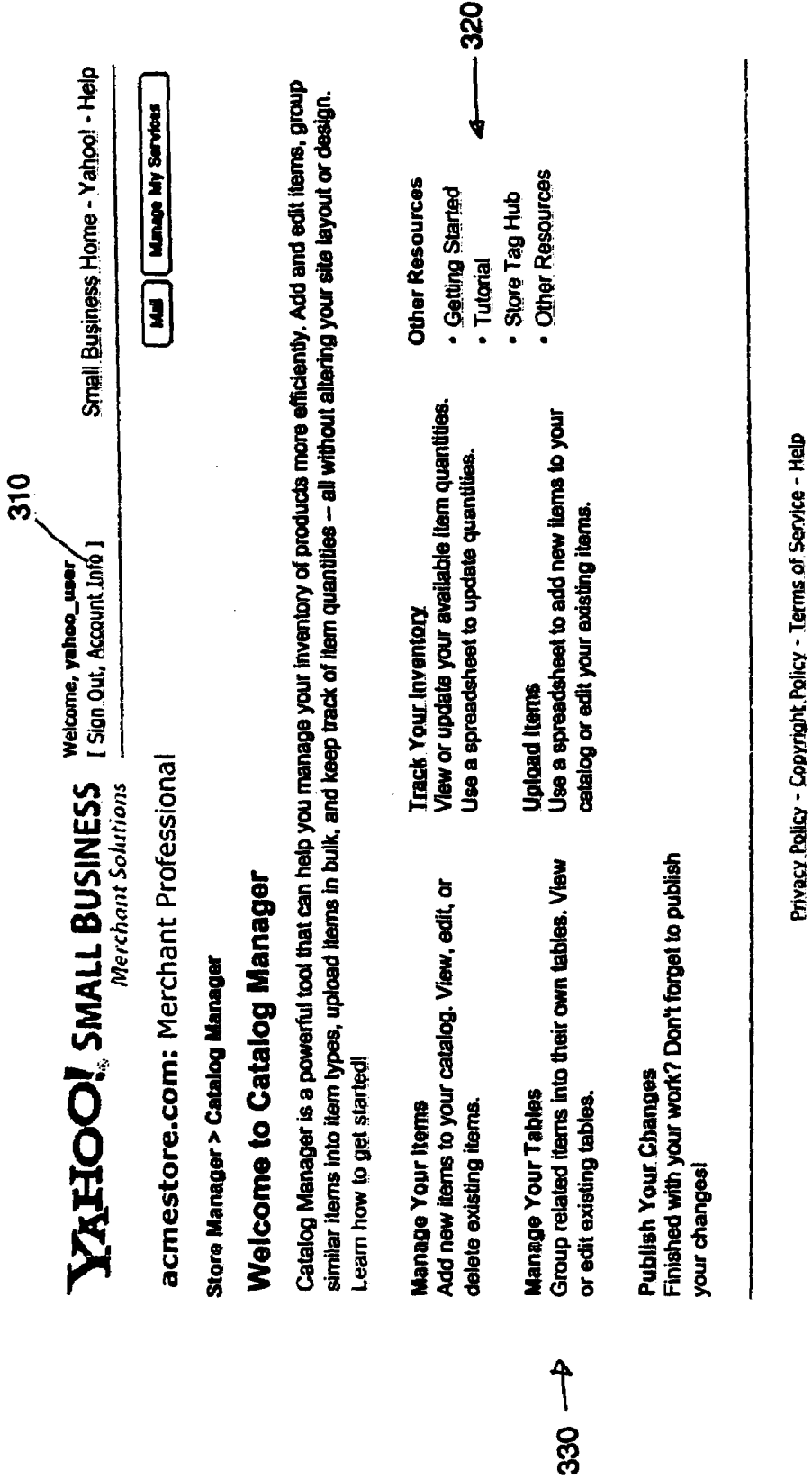
FIG. 3 is a graphical depiction of an initial web page for a self-service platform for catalog management.

FIG. 3 shows a login page for Catalog Manager. From this page, the user has a number of options. He can get more information about his account via link 310. In area 320, he can access other resources, including the store tag hub (described below). The catalog management functions 330 in this example are divided into five main areas: managing items, managing tables, importing/exporting data, inventory functions, and publication. On later web pages, these five areas can be accessed by tabs on the web page. FIGS. 4-6, 7-9, 10-11, 12 and 13 illustrate each of these five functional areas in more detail.

FIGS. 4A-4E show pages for viewing items in the catalog. Different subsets of items can be selected for viewing. FIG.

4A shows a web page where all tables 410 are selected for viewing and no other limits are put on the set of items to be viewed. As a result, all items in the catalog are part of the view set and, in this example, they are displayed in alphanumeric order. In FIG. 4B, the view set is restricted to the Cookies table 420 (note that the table assignments for the items are not consistent between FIGS. 4A and 4B). In FIG. 4B, there is no need to display a separate Tables field since all items in this view set are from the same table. In FIG. 4B, the item alphabet cookie has three options, which are currently displayed. The display can be expanded or collapsed to view or hide the different options.

The view set can also be defined in other ways. For example, the Search button 414 can be used to search for specific items or specific classes of items. FIG. 4C shows a form used to search for keywords within a particular table and field. FIG. 4D is an example of the display resulting from a search for the term "cookie" in the field "Name" for all tables. Other types of searches can also be performed. For example, the view set could be defined by all items that are currently on sale, or all taxable items, or all items in the Table "Cookies" that also have the word "Chocolate" in the name. Standard search techniques can be used to define and fill search requests.

The layout of the display itself can also be changed by the user. For example, the fields displayed in FIG. 4A are ID, Name, . . . Table. These fields can be customized. FIG. 4E shows a user interface that allows the user to determine which fields should be displayed. The displayed fields can be different for different tables. Standard techniques can be used to modify the layout with respect to font, color, alignment, etc. The display of FIGS. 4A-4B is in the form of a table with 25 items shown per display page. The number of items per page can be varied. In other implementations, layouts other than table based can be used.

Returning to FIG. 4A, from the item display, the items can be edited. Clicking on a specific item allows the user to edit the catalog entries for that item. The "Edit These Items" button 416 edits selected items. Items can be selected by checking specific check boxes 412. Clicking "Check All" 415 selects all items. A specific "Change Prices" button 417 is available as a shortcut since changing price is a common edit. Items can be selected for editing in other ways, for example by highlighting selected items. The "Add Item" button 419 allows the user to add new items.

Figure 5A:

FIGS. 5A-5B show pages for adding an item. In this example, the "Add Item" button 419 was clicked while viewing items for the table TableX. Therefore, this new item will be added to TableX. FIG. 5A shows an entry form with the fields for TableX. Some of these fields are limited to menu choices (e.g., Taxable field is either Yes or No). Some can accept free form text (e.g., the Options field). Some can accept uploads (e.g., the Image and Icon fields). In the Options field, clicking on "Enter Individual Item Codes" leads to the entry form shown in FIG. 5B. This page allows the user to specify the different options available for this item. Once the form in FIG. 5A is completed, the user clicks "Save" or "Save and Add Another." The submitted information is checked, for example to ensure that all mandatory fields are completed. Once there are no errors, the new item can be added to the catalog. The user typically receives a confirmation.

Items can also be added in other ways. For example, data about items can be uploaded to the catalog rather than individually adding each item as shown in FIGS. 5A-5B. Alternately, templates can be built for different classes of items so that certain fields are already filled in, or scripts can be used to automate filling in fields.

FIGS. 6A-6D are pages used to edit items in a catalog. Referring to FIG. 4A, if the user selects a single item to be edited, this can be achieved by displaying the page shown in FIG. 5A but with the fields filled in with their current values. The user can then edit the fields. If the user selects multiple items to be edited, for example an entire table, a set selected by a search, or the entire catalog, the page shown in FIG. 6A can be more appropriate. In this case, the items and fields are shown in table format but the fields can be edited.

FIG. 6B shows a "verification" page when the user has requested to delete certain items. In this example, the user has selected four items from the display of FIG. 4A, and then clicked the "Delete" button 421. The page in FIG. 6B verifies the request, also noting that the item "crackers" has four options that will also be deleted. This feature can be especially useful if the user has defined groups of items and then requests to delete the entire group. The verification can explicitly list all the items in the group to confirm that the user indeed desires to delete all of the items. Returning to FIG. 6B, if the user does not want to delete all four items, he can uncheck the items that are not to be deleted.

FIG. 6C shows a form when the user has requested to move certain items from one table to another. The user has selected four items from the display of FIG. 4A, and then clicked the "Move" button 423. The user specifies the destination table using the form of FIG. 6C. In some cases, a move can result in the deletion of fields, for example if the destination table does not include a field contained in the same table. In these cases, a verification page can alert the user to this situation before moving the items.

FIG. 6D shows a form for certain types of price changes. The "Change Prices" button 417 in FIG. 4A activates this form. Using this page, the user can apply a certain percentage discount to all tables or just to certain tables. The user can also turn sale pricing on and off. Pricing can also be edited using the techniques described above for other fields.

Turning now to table management, FIG. 7 shows a page for viewing tables in the catalog. The layout, organization and manipulation of this web page (and other web pages for manipulating tables) are similar to the approach used to manipulate items, as shown in FIGS. 4-6. This is beneficial since an intuitive and simple user interface is especially desirable for a self-service platform. Users ideally will be able to learn the user interface on their own and with limited documentation. This example displays all tables in the catalog, along with their name, description and the number of items in the table. The check boxes serve the same function as in FIGS. 4, allowing the user to select tables.

Many of the options described with respect to viewing items are also applicable to viewing tables. For example, the user may want to select a subset of tables for viewing, to expand or collapse parts of the table display, to perform searches, and/or to change the layout of the table display. In this example, fewer options are provided for manipulating the table display than are provided for the item display, mainly because far fewer tables are expected.

The "Create New Table" button 719 allows the user to add new tables. FIGS. 8A-8F show pages for adding a table. In FIG. 8A, the user enters the table name and a description of the table.

Next, the user defines which fields are included in the table. In this example, the fields are divided into subsets: mandatory fields, store fields, shopping fields and custom fields. FIGS. 8B-8E show entry forms for each respective subset. In this example, each field is defined by its name, its format (number, text, yes-no, etc.), whether it is required to be filled in for each item (which is different than whether the field is required to be included as part of a table), and a default value, if any. FIG. 8B shows the entry form for mandatory fields in this example. Mandatory fields must be included for all tables. The name and format are already defined. Most mandatory fields are also required for all items.

FIG. 8C shows the entry form for store fields. In this example, store fields are predefined in order to standardize fields across users. However, these fields are not required to be included with all tables. Thus, this form also includes a column "Include" which determines whether a field is to be included in this particular table. Shopping fields are handled similarly to store fields. FIG. 8D shows the entry form for shopping fields. Finally, FIG. 8E shows an entry form that allows the user to define custom fields.

FIG. 8F is a verification page for creating a table. The submitted information is typically checked as part of this process. The Edit buttons 810 permit the user to revise any information. Like items, tables can also be added in other ways.

Figure 9A:
FIGS. 9A-9B are graphical depictions of web pages for editing a table in a catalog.
Figure 9B:
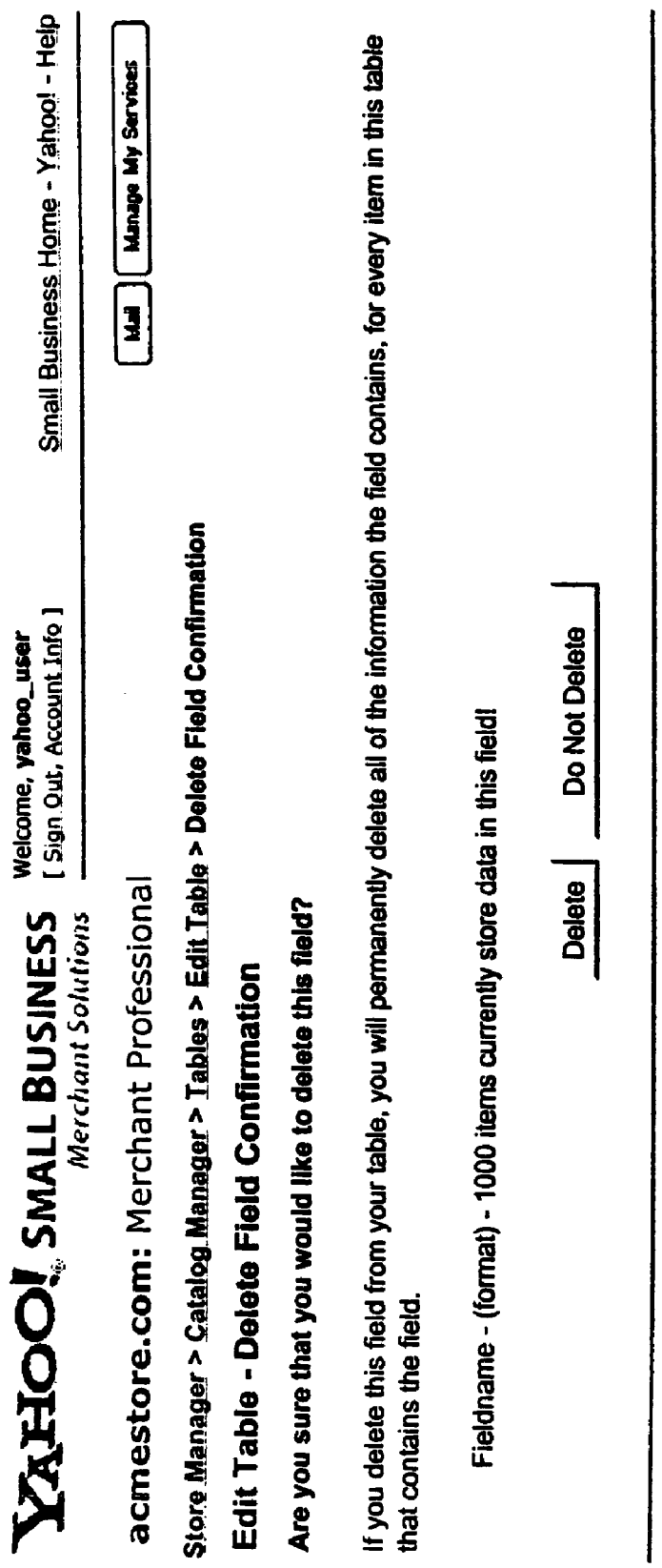

In FIG. 7, clicking on a specific table allows the user to edit the information for that table. FIG. 9A is a web page used to edit a table in a catalog. This page operates similarly to the one in FIG. 8F. Clicking an Edit button brings up the corresponding section of the table, which the user can then edit. When edits are complete, the user clicks the Save button. If the user is deleting fields, a verification page first reminds the user that information in the deleted fields will be lost, as shown in FIG. 9B.

FIGS. 4-9 were form-based approaches to editing a catalog. The catalog can also be modified in other ways. FIG. 10 shows an example where data is imported into a catalog. In this example, the import process is divided into two steps: upload and commit. The upload step includes converting the source data from its original form into the form compatible with the product database, for example defining which fields in the source data correspond to which fields in the catalog. The commit step includes combining the uploaded data with the existing database. In this example, there are two forms of commit: add, where new records are added to the product database and rebuild, where existing records are revised or replaced with the imported records.

FIG. 10A shows a web page that allows a user to upload data by clicking the "Upload" button. This brings the user to the form in FIG. 10B. Here, the user specifies the destination table within the catalog, whether the table will be added to or rebuilt, and the source file for the upload. In later pages, the user can also specify how fields in the source file map to those in the destination table. Clicking "Upload" initiates the upload (after verification). FIG. 10C is the results page where the upload encountered errors, which are shown in the "Warning and Errors" section. Separating the upload and commit processes allows the user to correct any warnings and errors before affecting the product database.

When the user is satisfied that the source data is uploaded correctly, he clicks "Commit," which then implements the add or rebuild, as appropriate. The commit step typically is verified before it executes. The verification page may include warnings regarding potential errors or information that will be lost. FIG. 10D shows a web page after the commit process has been performed. In this example, the user has committed the upload from FIG. 10C (i.e., the one with the errors). As a result, the commit process also reflects these errors. It may be that the error warnings are erroneous.

Figure 11:
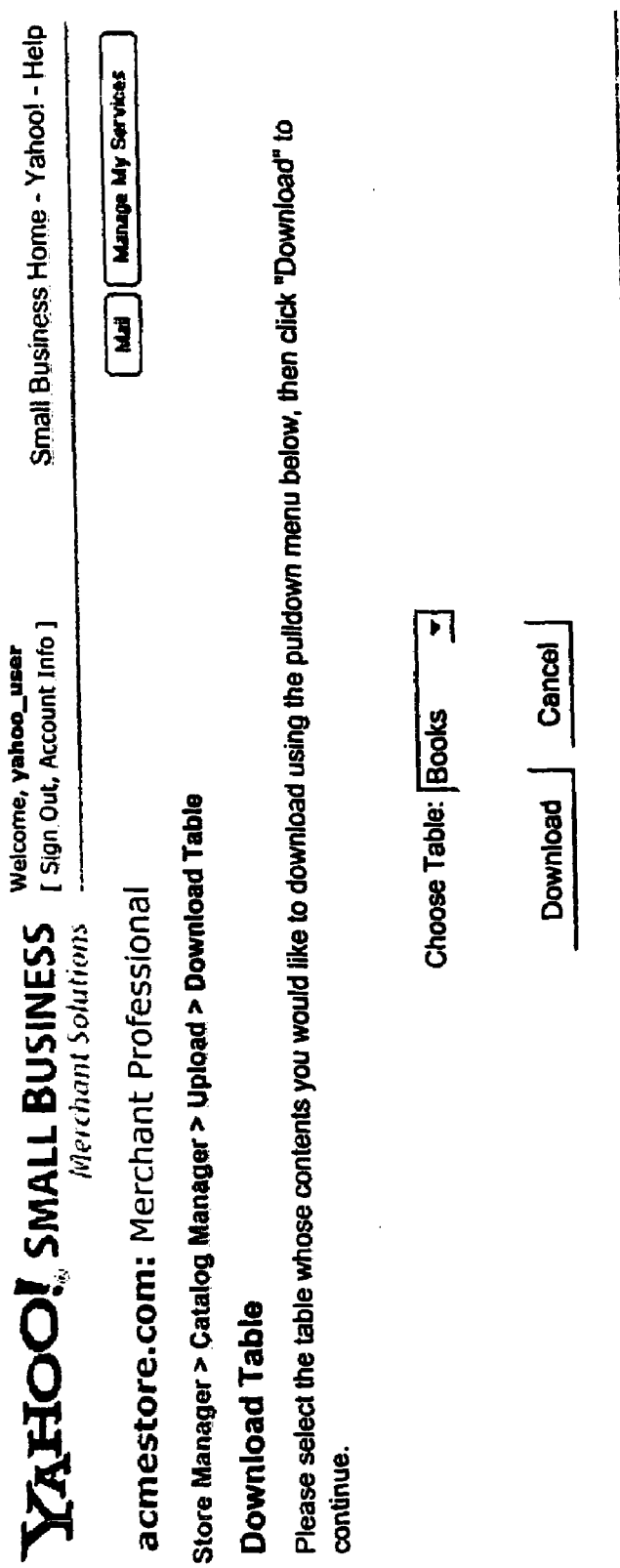
FIG. 11 is a graphical depiction of a web page for exporting data from a catalog.

Data can also be exported from the product database. FIG. 11 shows a form for downloading a table from a catalog.

Figure 12B:

Turning now to inventory management, FIGS. 12A-12B show web pages for managing inventory. Inventory management can be handled within the general framework for catalog management, for example as described above in FIGS. 3-11. However, in this example, inventory management also has dedicated web pages due to the importance of this function. In some implementations, inventory data is also stored in a database separate from the rest of the catalog data. That is, the product database may contain a separate inventory database.

FIG. 12A shows a web page for viewing inventory. The layout, organization and manipulation of this web page (and other web pages for editing inventory) is similar to the pages used to manipulate items and tables, as shown in FIGS. 4 and 7. This is beneficial since it makes the self-service platform easier to learn and use. This example displays inventory for all items in the table "Cookies." Clicking the "Edit" button 1216 allows the user to edit the inventory, for example as shown in FIG. 12B. The "Upload" and "Download" buttons 1222 and 1224 facilitate the import and export of inventory data.

FIGS. 3-12 show different web pages for assisting a merchant to manage his catalog. Typically, there will be two versions of the catalog. The published catalog is the version that is currently implemented on the site. It is the one that customers will experience when they visit the merchant's storefront on the site. The working catalog is a version that the merchant can use to make edits, revisions, etc. without affecting the customer's experience. In a typical architecture, the catalog management functions described above affect the working catalog, not the published catalog. When the merchant desires for the working catalog to go live, he publishes the working catalog. FIG. 13 shows a verification page for publication of a working catalog.

FIGS. 3-13 illustrate one example of a self-service platform for catalog management. In this example, the pages generally adopt a common approach to viewing and editing the catalog. In addition, the user is not given unlimited freedom to manipulate the catalog. Rather, the platform is designed to automate the most common functions and to limit user access to sophisticated or complex manipulations. This is advantageous for a self-service platform that is intended to be used by large numbers of smaller merchants. The common approach to layout and editing makes the platform easy to learn and intuitive to use, even without training classes or lengthy documentation. The limited freedom for users reduces the risk that unsophisticated users will accidentally harm their own catalogs or that malicious users will intentionally do the same to the catalogs of others. It also reduces the amount of technical support required for the platform, thus reducing the cost to the end user.

In addition, the invention is not limited to the specific example of FIGS. 3-13. Many other variations will be apparent. For example, a different look and feel for the user interface can be used. The displays need not use a table format. They can contain images, audio and other types of information. They can be voice-activated or support other types of I/O. In addition, the user interface can be customized for each individual user. For example, users could customize the first page (or other pages) of Catalog Manager to suit their needs.

The interface for manipulating the catalog also need not be limited to web pages, forms and the import/export of data. Software automation can be supported. For example, the catalog can be designed to be manipulated via an API, a command set and/or scripts. These options make it easier for the catalog to be directly interfaced to other systems, for example the inventory management system at the merchant's warehouse or a master price sheet. Templates can also be provided to automate tasks that are likely to be common among many users.

In addition, the management functions implemented are not limited to those shown in FIGS. 3-13. For example, in alternate versions, pricing can be based on a more sophisticated schedule or table (e.g., pricing automatically changes over time, or with inventory remaining, or with quantity purchased). As another example, availability of items may automatically vary over time. The platform can also allow the user to set up alerts or notifications. For example, the user may desire an alert when inventory drops below a certain level (or remains above a certain level for too long). Different reports can also be generated for the user.

The catalog is also not limited to an organization based on tables, items and options. Other structures can be supported. For example, the user can define groups, or even groups of groups, etc. Alternately, an object-based structure can be used, where child objects inherit attributes from their parent objects.

Figure 14:
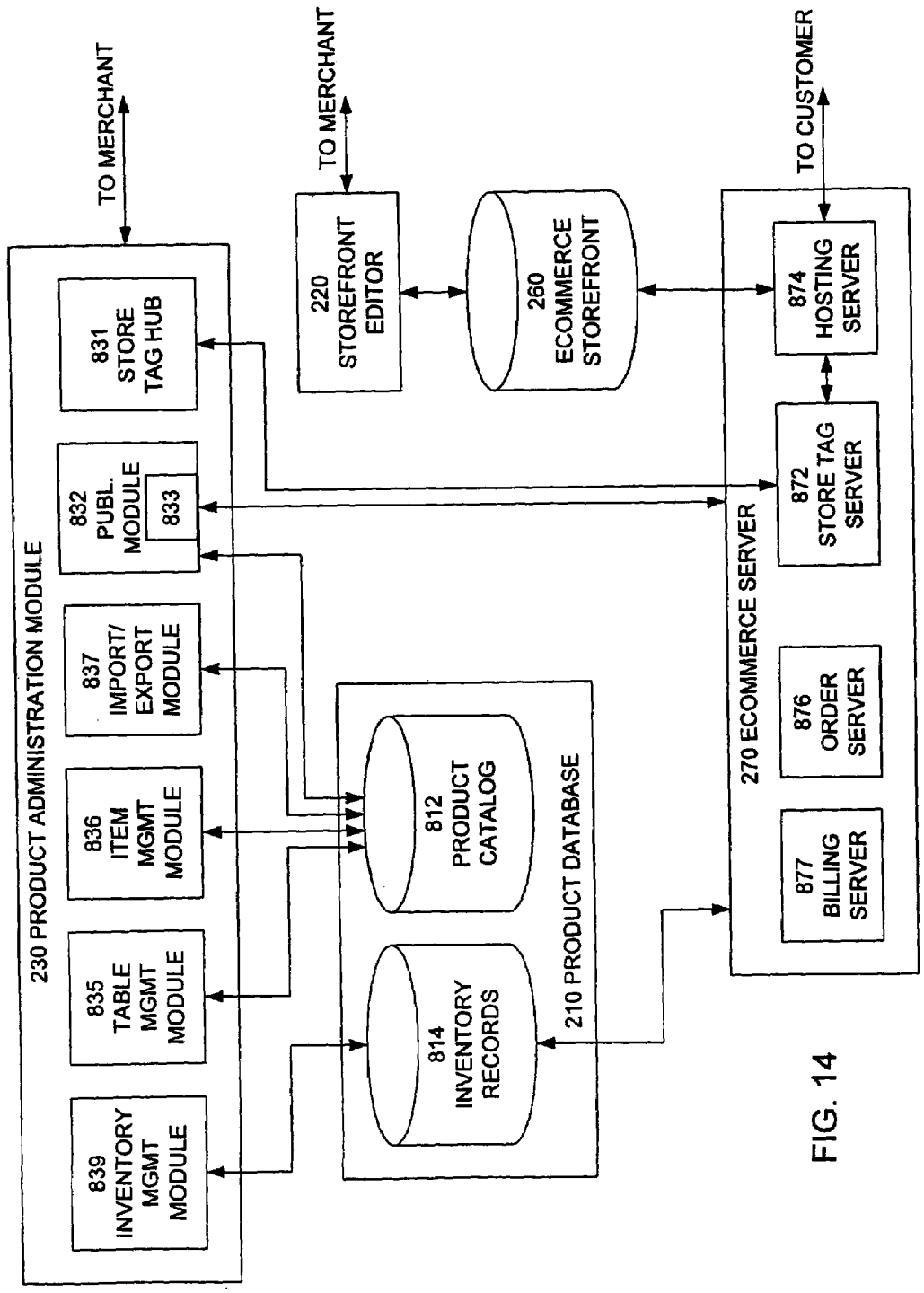
FIG. 14 is a block diagram of an example store according to the invention.

Turning now to FIG. 14, FIG. 14 is a simplified block diagram of a store according to the invention. In this example (as is the case throughout this disclosure), the same component may be referred to as a module, server or other descriptive term, for example "hosting," "hosting module," "hosting server," or "hosting application." It should be understood that these components are not meant to be limited to a specific physical form. In most cases, the preferred implementation currently is software. However, depending on the specific application, they can be implemented as hardware, firmware, software, and/or combinations of these. Furthermore, different components can share common sub-components or even be implemented by the same sub-components. There may or may not be a clear boundary between different components.

Comparing FIG. 14 with FIG. 2, the product database 210 is implemented as a product catalog 812 and inventory records 814. The product catalog 812 includes information for the store's catalog, for example items offered for sale, images of the items, pricing, text description, different options, etc. The product catalog 812 uses the structure of tables, items and options as described above. The information in the product catalog 812 is stored as tables; each row in a table corresponds to one item. Relational databases are not used in this example. Options are handled by encoding the options to produce a single string and then storing that string in the Options field of the table. The string is decoded when information about options is desired. The inventory records 814 are separated from the rest of the catalog and are stored using conventional techniques.

The ecommerce storefront 260 stores the web pages for the presentation to the customer. The web pages typically contain references to other locations, for example images, dynamic feeds, advertising and/or store tags. Store tags are references to information from the product database 210. The storefront editor 220 assists the merchant to build and maintain his ecommerce site. It can include templates to automate the building of the merchant's storefront.

The product administration module 230 includes modules that assist the merchant to manage the product database. The merchant accesses the administration module 230 via a URL. The specific modules shown in FIG. 14 correspond to the functions described in FIGS. 3-13. The item management module 836, table management module 835 and import/export module 837 implement the item management, table management and import/export functions described in FIGS. 4-6, 7-9 and 10-11, respectively. These modules primarily interface with the product catalog 812 in order to edit the catalog. The inventory management module 839 implements the inventory functions described in FIG. 12. It primarily interfaces with the inventory records 814.

The publication module 832 is responsible for publication of the catalog, as described in FIG. 13. The published catalog is depicted as box 833 in FIG. 14. Other components access the published catalog 833 via the publication module 832. For example, the ecommerce server 270 interacts with the publication module 832 to access the published catalog 833, rather than accessing the product catalog 812 directly. The box 833 in FIG. 14 is merely a graphical depiction. It is not meant to imply that the published catalog 833 is stored as part of the publication module 832 or even that the published catalog 833 is separate from the product catalog 812. For example, in one implementation, a common database is used to store both the published catalog and the "working" catalog. Each row in each table is flagged as either published or not.

If the merchant desires, he can export the published catalog 833. Thus, for example, the merchant can export the published catalog 833 and then use development tools other than the storefront editor 220 to build the store site. Examples of other development tools include Macromedia's DreamWeaver, Microsoft's FrontPage and other HTML editors. When the web pages are loaded back into the system, store tags provide the linkage to information contained in the product database. The published catalog 833 can also be exported to other marketplaces. Separating the product catalog from the storefront look and feel allows the merchant to build the catalog once and reuse it with different storefronts in many marketplaces.

In FIG. 14, the store tag hub 831 is a module that assists the merchant in the use of store tags. The store tag hub 831 can contain information describing the concept of store tags, a tutorial on their use and/or tools to facilitate their use. For example, the store tag hub 831 can include wizards to help the merchant identify the correct store tag for a particular piece of information.

On the customer side, the ecommerce server 270 includes a hosting server 874 and a store tag server 872, as well as other servers. An order server 876 and a billing server 877 are shown in FIG. 14, although other components (e.g., image server, search server, library server, redirect server, wallet technology, credit card processing, tax and shipping and handling tables, etc.) typically will also be used. The ecommerce server 270 accesses the various data sources. In this example, the ecommerce server 270 can access the inventory records 814 and ecommerce storefront 260, and can obtain the published catalog 833 via the publication module 832.

The hosting server 874 is responsible for serving the storefront web pages to the customer. It retrieves the web pages from the ecommerce storefront 260. Store tags in the retrieved web pages are passed to the store tag server 872, which resolves the store tags based on the published catalog 833. In this implementation, the store tags are server-side include (SSI) HTML tags. The store tag server 872 is a web server that dynamically serves data elements from the product catalog in the HTML page. This is done when the page is served but while keeping a static page URL. The hosting server 874 communicates with the store tag server 872 via whproxy.

To reduce unnecessary communication, the results of store tag expansion are cached. In one approach, when the hosting server 874 first encounters a store tag for a particular store on a web page, it checks for a cached copy of the page (e.g., saved as a hidden file with the same name and location as the original file). The cached copy is used if it has a more recent time stamp than the retrieved web page and the catalog has not been updated in the interim. In this case, no further requests need be sent to the store tag server 872 for this particular store and page. If the cached page is out-of-date or there is no cached page, the current page is also stored as a cached copy. Store tags are expanded in the cached copy. In an alternate approach, store tags can be cached on a tag-by-tag basis rather than on a page-by-page basis.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents. Furthermore, no element, component or method step is intended to be dedicated to the public regardless of whether the element, component or method step is explicitly recited in the claims.

What is claimed is:

1. A method for managing stores implemented on an Internet, the method implemented on a computerized self-service platform and comprising:
    storing information concerning products offered for sale through the stores in a product database that provides product information for each of the stores;
    storing information concerning a presentation of the stores to customers in an e-commerce storefront for each of the stores;
    presenting, on the e-commerce storefront for each of the stores, the information concerning the products that is stored in the product database based on store tags in the e-commerce storefront that reference the product information in the product database, wherein the store tags are used to dynamically retrieve the information;
    providing an interface for a first merchant to update the product database and e-commerce storefront for one of the stores and for a second merchant to update the product database and e-commerce storefront for another one of the stores; and
    updating the presentation of the store on the e-commerce storefront in real-time after the product database is updated.

2. The method of claim 1 wherein the self-service platform is accessible by the user through a web URL.

3. The method of claim 1 wherein the step of storing information concerning a presentation of the store comprises:
    storing a web page for a storefront of the store in the e-commerce storefront.

4. The method of claim 3 wherein the store tags are dynamic elements in the web page that reference information stored in the product database and dynamically update the e-commerce storefront upon an update to the product database.

5. The method of claim 1 wherein the step of storing information concerning products offered for sale comprises:
    storing said information in at least one table, each table in the at least one table organized into a plurality of items with at least one item in the plurality of items having at least one option.

6. The method of claim 1 wherein the step of providing an interface for a user to update the product database comprises:
    assisting the user to define a plurality of groups within the product database, wherein the user can manipulate the product database by manipulating the plurality of groups.

7. The method of claim 1 wherein the step of storing information concerning products offered for sale through the store in a product database comprises:
    storing catalog-related information in a product catalog; and
    storing inventory-related information in inventory records.

8. The method of claim 1 further comprising:
    updating products displayed at the store in real-time as the user publishes edits to the product database.

9. A system for managing stores implemented on an Internet, comprising:
    an executable product database storing information in a computer readable medium concerning a plurality of products offered for sale through the stores, wherein each store includes at least a portion of the products for sale;
    an e-commerce storefront computer for each of the stores that includes information concerning a presentation of that store to customers, said information referencing information stored in the product database, wherein each of the stores has an e-commerce storefront computer;
    a store tag hub configured to manage store tags, wherein the store tags dynamically couple the information stored in the product database to at least one of the e-commerce storefronts computers; and
    an executable product administration module in a computer readable medium coupled to the product database and accessible by a plurality of users for managing the product database on a self-serve basis, wherein the store tags automatically update the at least one e-commerce storefront computer upon an update to the product database by one of the users, wherein the e-commerce storefront computer for each of the stores and the at least a portion of the products for each of the stores is managed by the product administration module.

10. The system of claim 9 wherein the product administration module is accessible by the user through a web URL.

11. The system of claim 9 wherein the e-commerce storefront computer stores a web page for a storefront of the store.

12. The system of claim 11 wherein the web page includes the store tags, the store tags referencing product data stored in the product database, wherein the product data stored in the product database is displayed at the e-commerce storefront by the store tags.

13. The system of claim 9 wherein the product database comprises:
   a product catalog for storing catalog related information; and
   inventory records for storing inventory related information.

14. The system of claim 13 wherein the product administration module comprises:
   an inventory management module for managing the inventory records.

* * * * *

UNITED STATES PATENT AND TRADEMARK OFFICE
CERTIFICATE OF CORRECTION

PATENT NO. : 7,359,873 B2  Page 1 of 1
APPLICATION NO. : 10/800146
DATED : April 15, 2008
INVENTOR(S) : Roberts et al.

It is certified that error appears in the above-identified patent and that said Letters Patent is hereby corrected as shown below:

On the Title Page

Item should be

[*] Notice: Subject to any disclaimer, the term of this patent is extended or adjusted under 35 USC 154(b) by (575) days Delete the phrase "by 575 days" and insert -- by 547 days --

Signed and Sealed this

Fourteenth Day of October, 2008

JON W. DUDAS
*Director of the United States Patent and Trademark Office*